(12) United States Patent
Fong

(10) Patent No.: US 9,949,328 B1
(45) Date of Patent: Apr. 17, 2018

(54) CONSTANT VOLTAGE OUTPUT AC PHASE DIMMABLE LED DRIVER

(71) Applicant: GRE Alpha Electronics Limited, Hong Kong (HK)

(72) Inventor: Richard Fong, Hong Kong (HK)

(73) Assignee: GRE Alpha Electronics Limited, Hong Kong (HK)

( * ) Notice: Subject to any disclaimer, the term of this patent is extended or adjusted under 35 U.S.C. 154(b) by 0 days.

(21) Appl. No.: 15/410,186

(22) Filed: Jan. 19, 2017

(51) Int. Cl.
 *H05B 33/08* (2006.01)
 *H05B 37/02* (2006.01)

(52) U.S. Cl.
 CPC ..... *H05B 33/0845* (2013.01); *H05B 33/0812* (2013.01); *H05B 37/0254* (2013.01)

(58) Field of Classification Search
 CPC ............ H05B 33/0845; H05B 33/0812; H05B 37/0254

USPC ....................................................... 315/200 R
See application file for complete search history.

(56) References Cited

U.S. PATENT DOCUMENTS

2016/0330808 A1\* 11/2016 Brandt ............... H05B 33/0815

\* cited by examiner

*Primary Examiner* — Daniel D Chang
(74) *Attorney, Agent, or Firm* — Spruson & Ferguson (HK)

(57) ABSTRACT

A method and circuit for dimmable light emitting diode (LED) applications are provided. The circuit includes digital processing circuitry and a DC output chopper. The digital processing circuitry produces a pulse width modulated (PWM) signal in response to one or more of voltage, frequency, dimmer type and phase angle requirements determined from a voltage and a phase position of a received input signal. The DC output chopper is coupled to the digital processing circuitry and operates in response to the PWM signal to generate a chopped DC output duty cycle voltage signal from a DC output signal derived from the input signal to provide linear dimming for a LED load.

13 Claims, 6 Drawing Sheets

US 9,949,328 B1

CONSTANT VOLTAGE OUTPUT AC PHASE DIMMABLE LED DRIVER

TECHNICAL FIELD

The present invention generally relates to light emitting diode (LED) lighting systems, and more particularly relates to methods and devices for advanced power conversion for dimmable LED lighting applications.

BACKGROUND OF THE DISCLOSURE

Current constant voltage output AC phase light emitting diode (LED) lighting system dimmable converters require a fixed live (hot) input connection in addition to a dimmed live (hot) input connection, a neutral connection and a ground connection. However, in retro-fitted installations, the wiring does not typically provide a fixed live connection at the desired location because the fixed live connection was not necessary for incandescent lighting dimming circuits.

Moreover, AC phase dimmable converters currently available which may operate without a fixed live input can only operate in a constant-current mode operation, which is only applicable to LED lighting systems that operate from a constant-current source. Yet, many other LED lighting systems, such as linear lighting systems, require a constant-voltage power source, and thus can only be effectively dimmed by manipulating the DC voltage applied by, for example, duty cycle controlled pulsed width modulation (PWM) pulses or by changing the DC voltage level, both of which change the LED light output.

Thus, what is needed is a LED driver design which overcomes the drawbacks of the prior art systems and provides a constant voltage output AC phase dimmable LED driver. Furthermore, other desirable features and characteristics will become apparent from the subsequent detailed description and the appended claims, taken in conjunction with the accompanying drawings and this background of the disclosure.

SUMMARY

According to at least one embodiment of the present invention, a circuit for dimmable light emitting diode (LED) lighting applications is provided. The circuit includes digital processing circuitry and a DC output chopper. The digital processing circuitry produces a pulse width modulated (PWM) signal in response to one or more of voltage, frequency, dimmer type and phase angle requirements determined from a voltage and a phase position of a received input signal. The DC output chopper is coupled to the digital processing circuitry and operates in response to the PWM signal to generate a chopped DC output duty cycle voltage signal from a DC output signal derived from the input signal to provide linear dimming for a LED load.

According to another embodiment of the present invention, a method for providing linear dimming for LED lighting applications is provided. The method includes producing a PWM signal in response to one or more of voltage, frequency, dimmer type and phase angle requirements determined from a voltage and a phase position of a received input signal and generating, in response to the PWM signal, a chopped DC output duty cycle voltage signal from a DC output signal derived from the input signal to provide linear dimming for a LED load.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages in accordance with a present embodiment.

And FIG. 4, comprising FIGS. 4A, 4B and 4C, depicts graphs of operation of the microcontroller of the LED driver of FIGS. 2 and 3 in accordance with the present embodiment, wherein FIG. 4A depicts a graph of e AC waveform of the line input voltage to the LED driver of FIGS. 1 to 3, FIG. 4B depicts a graph of time interval measurements on negative threshold transitions, and FIG. 4C depicts a graph of time interval measurements on positive threshold transitions.

Skilled artisans will appreciate that elements in the figures are illustrated for simplicity and clarity and have not necessarily been depicted to scale.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description. It is the intent of the present embodiment to present an advanced power converter designed for dimmable LED lighting. The present embodiment is intended specifically for LED lighting applications.

The present embodiment comprises an LED driver which provides a constant voltage output rectangular waveform with a duty cycle varying from 0% to 100%. The LED driver is designed to drive one or more back end current regulating stages to supply chopped constant current to the LED loads. A second regulating stage may be located in an integrated LED panel or "light engine" such that the LED light output is controlled by the constant voltage converter. A dimming control may be implemented in accordance with the present embodiment operating in response to detecting a phase angle of a leading or trailing edge phase cut dimmer, or operating by means of a 0V to 10V DC control input, or operating in response to a digitally addressable lighting interface (DALI) control input.

Figure 1:
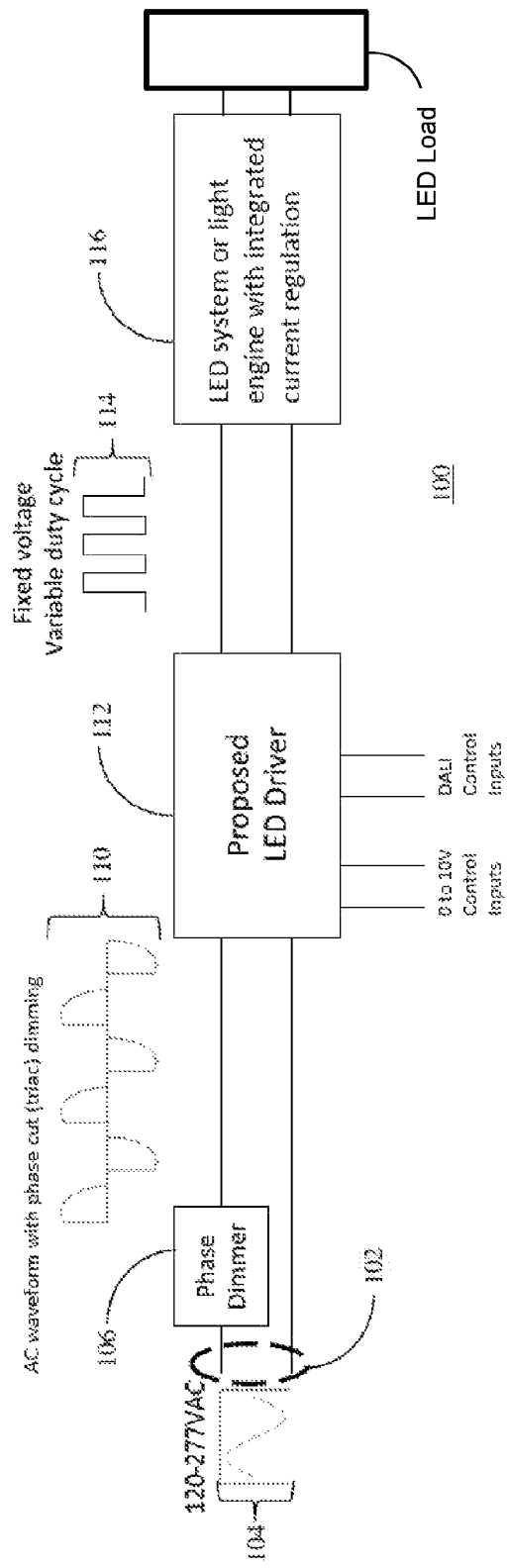
FIG. 1 depicts a block diagram of an AC phase dimmable power source for constant-voltage powered light emitting diode (LED) systems in accordance with a present embodiment.

Referring to FIG. 1, a block diagram 100 depicts a complete and effective AC phase dimmable power source for constant-voltage powered light emitting diode (LED) systems in accordance with a present embodiment. A two-wire input 102 provides a full cycle AC current signal 104 of between 120V AC and 227V AC. A phase dimmer 106 includes a TRIAC on one branch 108 of the two-wire input 102 to alter the AC current on the branch 108 with the TRIAC AC switch to provide an AC waveform 110. A novel LED driver 112 receives the AC waveform 110 and, in accordance with the present embodiment, converts the AC waveform 110 to a fixed voltage variable duty DC signal 114 which is provided to a light engine 116 with current regulation. The light engine 116 provides a constant-voltage output and manipulates the output voltage via pulse width modulation (PWM) and/or linear voltage level to enable the AC phase dimmable power source for constant-voltage powered LED systems. The AC phase dimmable power source in accordance with the present embodiment advantageously operates without a fixed live input and can support inputs from leading and trailing edge dimmers operating from AC supplies over the root mean square (rms) range 100V to 277V.

Figure 2:
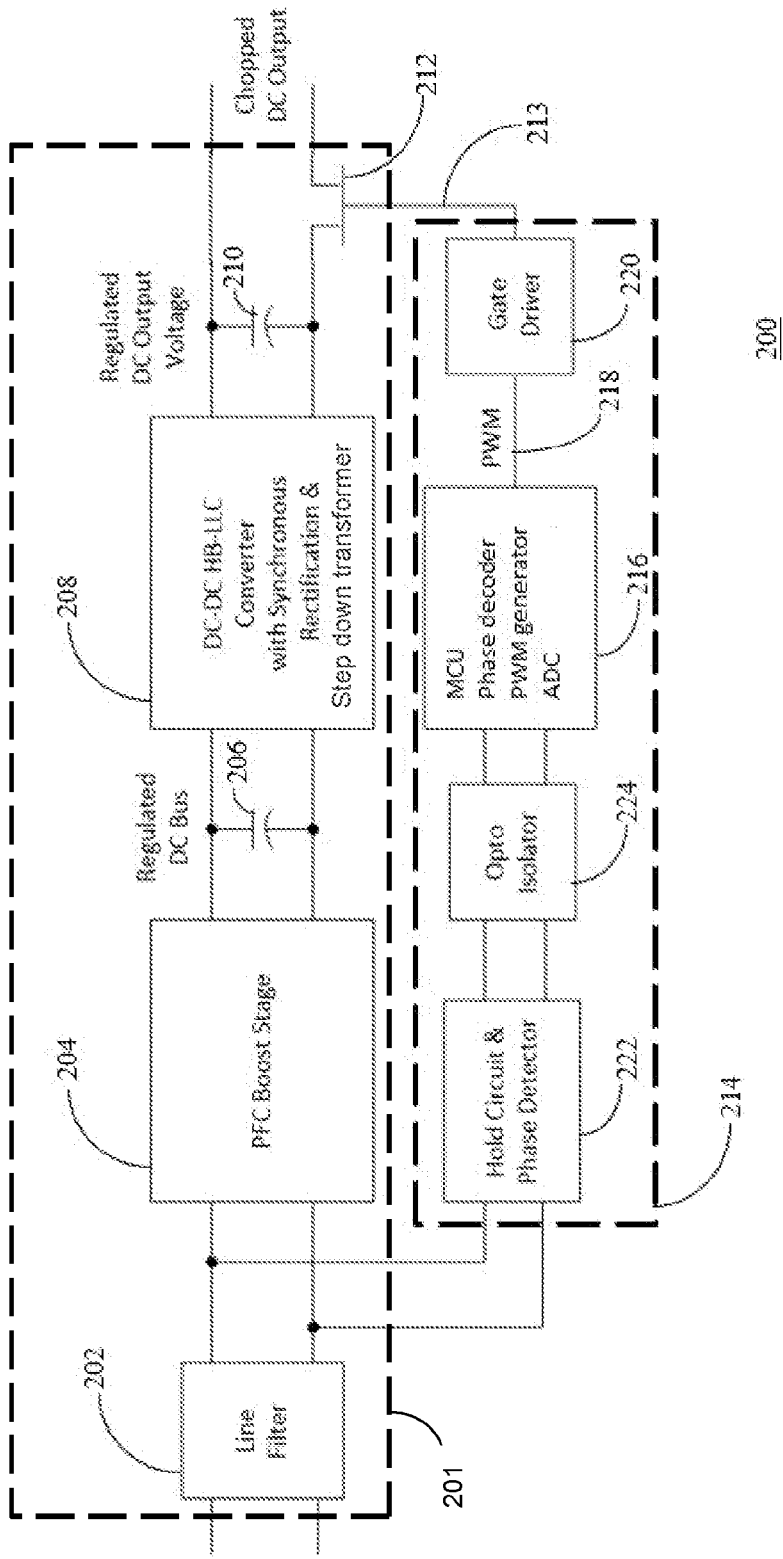
FIG. 2 depicts a block diagram of a LED driver of the AC phase dimmable power source of FIG. 1 in accordance with the present embodiment.

Referring to FIG. 2, a block diagram 200 depicts a topology of the LED driver 112 in accordance with the present embodiment. An analog-to-digital conversion circuitry 201, coupled between the received AC input signal and the DC output signal, comprises a line filter 202, a power factor correction (PFC) boost stage 204 and an isolated step down DC-DC stage half-bridge LLC resonant converter 208. The line filter 202 filters the AC waveform 110 inputted to the LED driver 112 (FIG. 1) and provides the filtered signal to the PFC boost stage 204. The PFC boost stage 204 enables active power factor correction by maintaining a constant DC bus voltage at its output regulated by a capacitor 206 while drawing a current that is always in phase with and at the same frequency as the line voltage. The regulated DC bus voltage is provided to the isolated step down DC-DC stage half-bridge LLC resonant converter 208 with a step down transformer and a synchronous rectified output. The synchronous rectified DC output is voltage regulated by a capacitor 210 and a chopped DC output is provided by a DC output chopper 212 and provided on one branch of the regulated DC output voltage. In certain embodiments, the DC output chopper 212 is a transistor.

A control signal 213 is provided to the DC output chopper 212 by a circuit 214 which includes a micro-controller 216 for generating a pulse width modulated (PWM) signal 218 for providing to a gate driver 220 for generating the control signal 213. A hold circuit and phase detector 222 is coupled to the AC input to the PFC boost stage 204 and provides an output to the microcontroller 216 through an opto-isolator 224 to prevent high voltages from affecting the micro-controller 216. Firmware in the micro-controller 216 comprises a phase decoder which decodes inputs from the AC line provided from the hold circuit and phase detector 222 to determine the input voltage, type of dimmer and phase position of the AC input signal. From this information, the micro-controller 216 is able to produce a chopped DC output duty cycle according to an algorithm designed to provide linear dimming over an appropriate range of adjustment.

The micro-controller 216 may optionally include an analog-to-digital converter (ADC) and/or a PWM generator (as shown in FIG. 2) if desired or required. The PFC boost stage 204 provides a converter topology as a front end pre-regulator which provides a regulated fixed DC bus voltage which varies only slightly over the input voltage, the LED load and the dimmer range. At low dimmer levels, the voltage will drop as the converter includes a current limit function.

The PFC boost stage 204 also provides a high power factor input source that will allow any phase cut dimmer to operate correctly. The impedance will appear as predominantly resistive to avoid any flicker or misfiring issues commonly associated with capacitive loads. The step down DC-DC stage half-bridge LLC resonant converter 208 provides an isolated low voltage output able to supply the required output voltage and current for the LED load. The DC output chopper 212 provides a fixed voltage output with a controllable duty cycle defined by the control signal 213 provided by the circuit 214.

Figure 3:
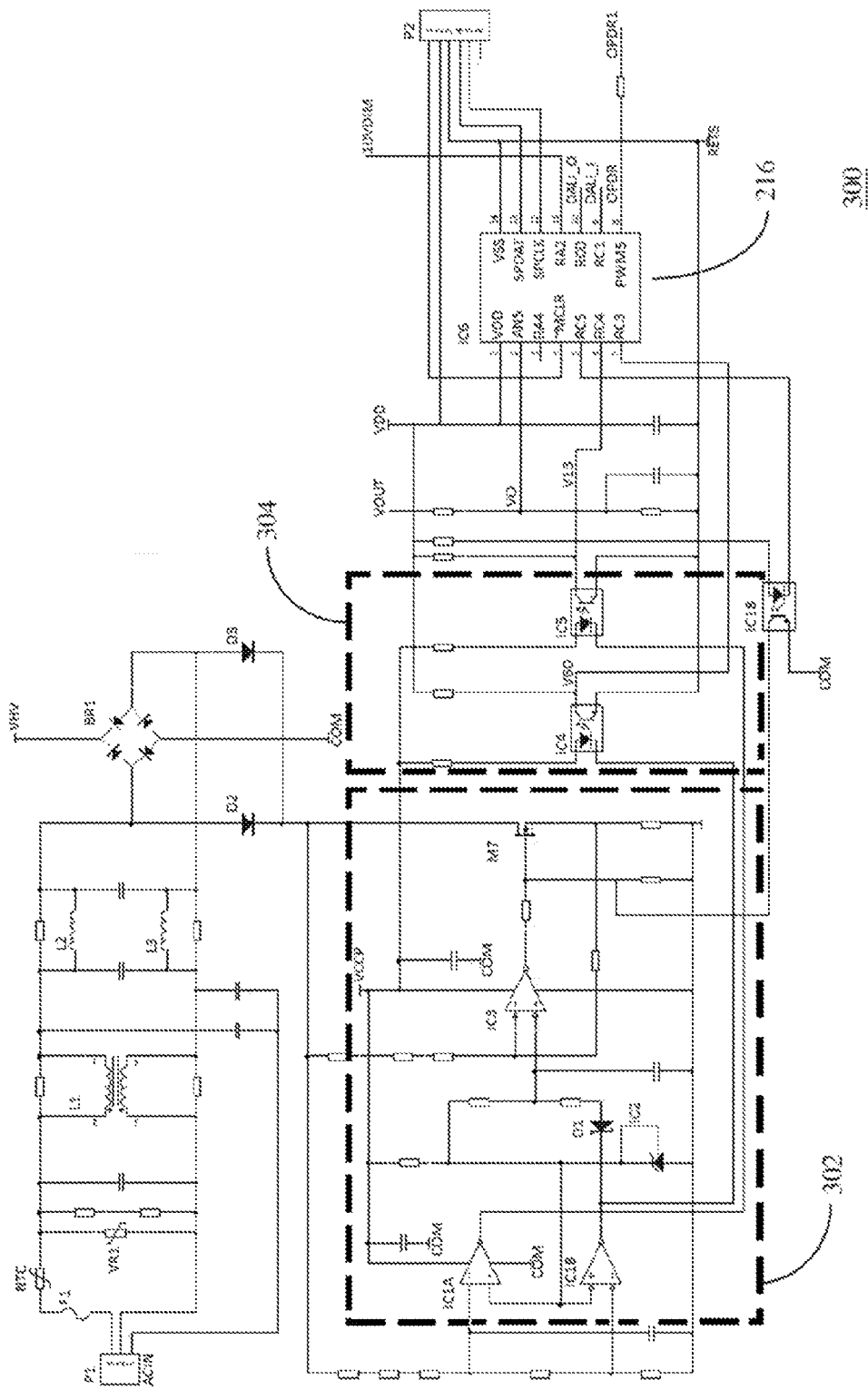
FIG. 3 depicts a circuit schematic diagram of the LED driver of FIG. 2 in accordance with the present embodiment.

Referring to FIG. 3, a circuit schematic diagram 300 depicts exemplary circuitry of the LED driver 112 in accordance with the present embodiment. An input detector 302 of the hold circuit and phase detector 222 detects when the line input voltage crosses two thresholds at 13V and 60V providing two digital signals indicating when the AC line input is above or below each threshold. These inputs are input to the micro-controller 216 through two opto-isolators 304 (the opto-isolator 224, FIG. 2). The micro-controller 216 is configured to generate an interrupt at either the positive or negative transitions of each of these inputs. The firmware of the micro-controller 216 measures the time intervals between these transitions to determine the voltage, frequency, dimmer type and phase angle required for the LED load.

The firmware of the micro-controller 216 also includes look-up tables for different dimmer options, which provide the output duty cycle for the DC output chopper 212 based on the dimmer type, line voltage and phase angle to advantageously provide the smoothest and most linear possible dimming for each LED load. In accordance with the present embodiment, a 0 to 10V analog dimming interface or a DALI dimming interface could be used.

Figure 4A:
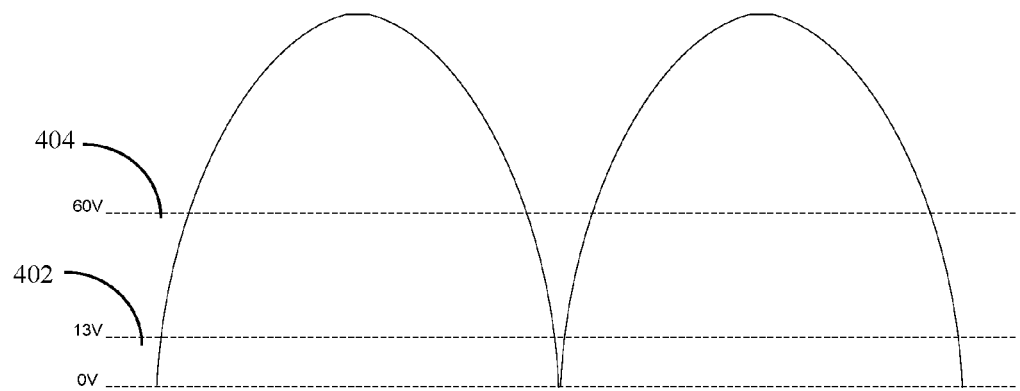
Figure 4B:
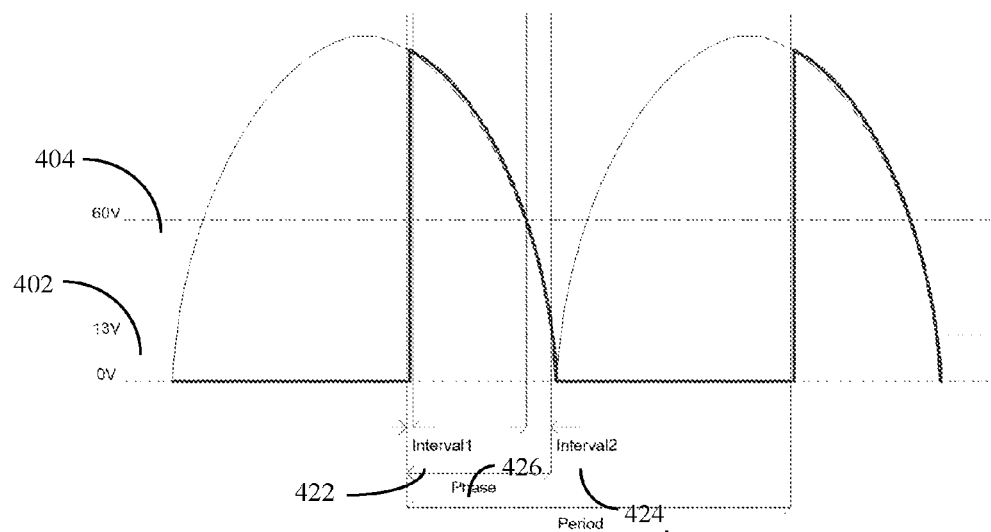
Figure 4C:
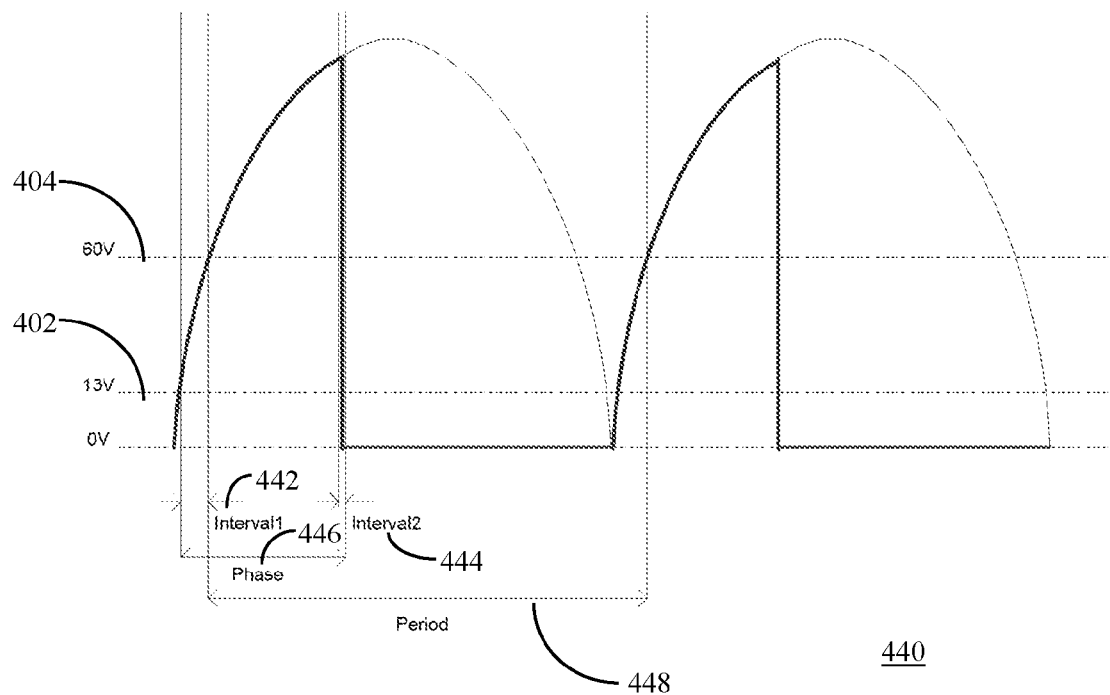
Figure 5:
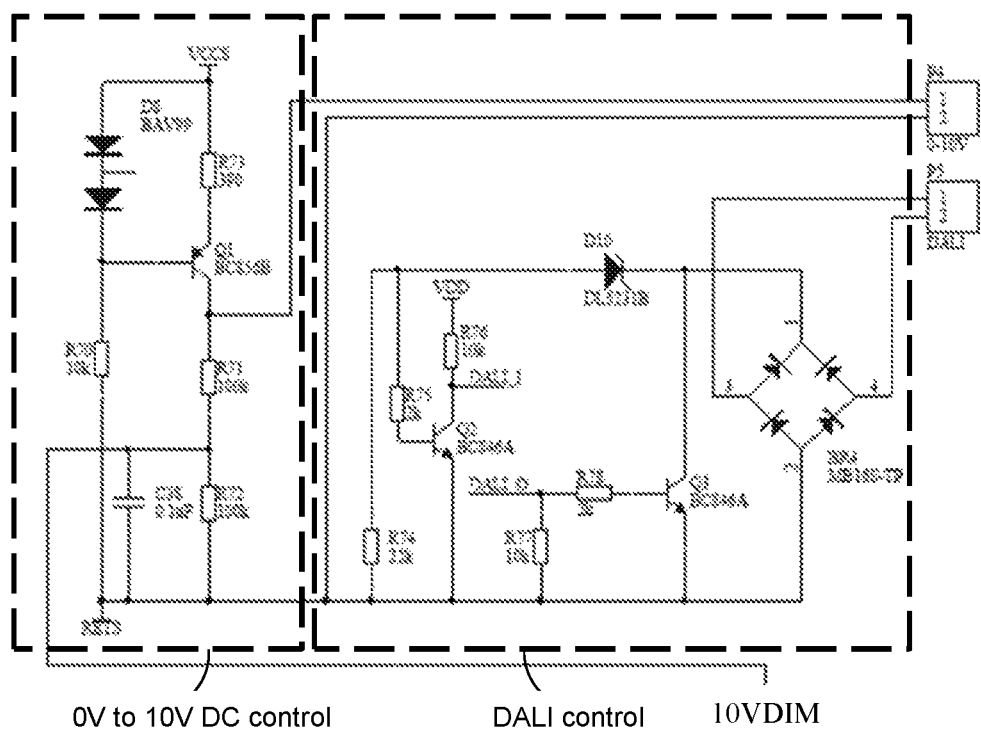
FIG. 5 depicts a circuit schematic diagram of the "0-10V Interface" and "DALI Interface" connecting to the microcontroller in the LED driver 112 of FIG. 1 in accordance with the present embodiment.

Referring to FIG. 4, including FIGS. 4A, 4B and 4C, depicts graphs of operation of the microcontroller 216 in accordance with the present embodiment. FIG. 4A depicts a graph 400 of the AC waveform of the line input voltage to the PFC boost stage 204 and the hold circuit and phase detector 222 of the LED driver 112. As said before, the hold circuit and phase detector 222 detects when the line input voltage crosses the 13V threshold 402 and the 60V threshold 404 to provide the two digital signals indicating when the AC line input is above and below each threshold.

Referring to FIG. 4B, a graph 420 depicts time intervals measured by the microcontroller between the negative transitions of the 60V and 13V thresholds 404, 402. The micro-controller 216 generates an interrupt at the negative transitions of each of the AC line input and measures a first time interval 422 for the transition from 0V to the AC line input voltage and a second time interval 424 for the transition of the AC line input voltage from 60V to 13V to determine a phase angle 426. The microcontroller 216 also uses these intervals and a period 428 between the start of the first intervals 422 to determine the voltage, frequency and dimmer type of the LED load.

Referring to FIG. 4C, a graph 440 depicts time intervals measured by the microcontroller between the positive transitions of the 13V and 60V thresholds 402, 404. The micro-controller 216 also generates an interrupt at the positive transitions of each of the AC line input and measures a first time interval 442 for the transition of the AC line input voltage from 13V to 60V and a second time interval 444 for the transition from the AC line input voltage to 0V to determine a phase angle 446. The microcontroller 216 also uses these intervals and a period 448 between 60V positive transitions to determine the voltage, frequency and dimmer type of the LED load.

Thus, it can be seen that the present embodiment provides a LED driver design which overcomes the drawbacks of the prior art systems and provides a constant voltage output AC phase dimmable LED driver and uses a combination of analog circuitry and digital processing to provide regulated DC chopped output voltage as well as current limiting, dimming and protection against overload or short-circuit for the LED load. The ability to decode other forms of control input may also advantageously be incorporated in the micro-controller firmware. As a result of the design advantages, the present embodiment enables flexibility in operation, as the mode of operation, electrical characteristics, and/or behavior of the system can be changed via the firmware and/or hardware, for a wide variety of LED lighting applications.

While exemplary embodiments have been presented in the foregoing detailed description of the invention, it should be appreciated that a vast number of variations exist. It should further be appreciated that the exemplary embodiments are only examples, and are not intended to limit the scope, applicability, operation, or configuration of the invention in any way. Rather, the foregoing detailed description will provide those skilled in the art with a convenient road map for implementing an exemplary embodiment of the invention, it being understood that various changes may be made in the function and arrangement of steps and method of operation described in the exemplary embodiment without departing from the scope of the invention as set forth in the appended claims.

What is claimed is:

1. A circuit for dimmable light emitting diode (LED) lighting systems with a phase dimmer, the phase dimmer altering a waveform of a received AC input signal for generating a phase cut AC input signal with either a positive transition or a negative transition of a first threshold voltage and a second threshold voltage, the circuit comprising:
a hold circuit and a phase detector, wherein the hold circuit further comprises a first comparator for detecting a first time point when the phase cut AC input signal crossing the first threshold voltage, and a second comparator for detecting a second time point when the phase cut AC input signal crossing the second threshold voltage;
a micro-controller for producing a pulse width modulated (PWM) signal in response to one or more of voltage, frequency, dimmer type and phase angle requirements determined from one or more signals selected from the group consisting of a first time interval of the positive transition, a second time interval of the positive transition, a first time interval of the negative transition, a second time interval of the negative transition, a period of the phase cut AC input signal, wherein:
the first time interval of the negative transition is a time interval for a transition from 0V to a first voltage level of the phase cut AC input signal;
the first time interval of the positive transition is a time interval for a transition from the first time point to the second time point;
the second time interval of the negative transition is a time interval for a transition from the second time point to the first time point; and
the second time interval of the positive transition is a time interval for a transition from a second voltage level of the phase cut AC input signal to 0V; and
a DC output chopper coupled to the micro-controller and operating in response to the PWM signal to generate a chopped DC output duty cycle voltage signal from a DC output signal derived from the phase cut AC input signal to provide linear dimming for a LED load.

2. The circuit in accordance with claim 1 wherein the period of the phase cut AC input signal is a third time interval between two consecutive second time points detected by the second comparator.

3. The circuit in accordance with claim 1 wherein the first threshold voltage is thirteen volts and the second threshold voltage is sixty volts.

4. The circuit in accordance with claim 1 further comprises analog-to-digital conversion circuitry coupled between the phase cut AC input signal and the DC output signal provided to the DC output chopper.

5. The circuit in accordance with claim 4 wherein the analog-to-digital conversion circuitry comprises a power factor correction (PFC) boost stage for active power factor correction to maintain a constant DC bus voltage at its output while drawing a current that is always in phase with and at the same frequency as the phase cut AC input signal.

6. The circuit in accordance with claim 5 wherein the analog-to-digital conversion circuitry further comprises a DC-DC half bridge LLC resonant converter including a step down transformer.

7. The circuit in accordance with claim 6 wherein the DC-DC half bridge LLC resonant converter further includes synchronous rectification circuitry.

8. The circuit in accordance with claim 1 further comprising a first opto-isolators coupled between the first comparator and the micro-controller and a second opto-isolator coupled between the second comparator and the micro-controller to prevent high voltages from affecting operation of the micro-controller.

9. The circuit in accordance with claim 1 wherein the DC output chopper is a transistor and wherein the PWM signal is coupled to a gate of the transistor.

10. The circuit in accordance with claim 9 further comprising a gate driver coupled between the micro-controller and the transistor for adapting the PWM signal for driving the gate of the transistor.

11. The circuit in accordance with claim 1 further comprising a light engine with current regulation coupled between the DC output chopper and the LED load for providing the linear dimming for the LED load.

12. The circuit in accordance with claim 1 wherein the circuit further comprises a digitally addressable lighting interface (DALI) control input coupled between the received AC input signal and the micro-controller.

13. A method for providing linear dimming for light emitting diode (LED) lighting systems with a with a phase dimmer, the phase dimmer altering a waveform of a received AC input signal for generating a phase cut AC input signal with either a positive transition or a negative transition of a first threshold voltage and a second threshold voltage, the method comprising:
detecting, by a hold circuit and a phase detector, a first time point when the phase cut AC input signal crossing the first threshold voltage and a second time point when the phase cut AC input signal crossing the second threshold voltage;
measuring, by the micro-controller, a first time interval of the negative transition or a first time interval of the positive transition, wherein the first time interval of the negative transition is a time interval for a transition from 0V to a first voltage level of the phase cut AC input signal and the first time interval of the positive transition is a time interval for a transition from the first time point to the second time point;
measuring, by the micro-controller, a second time interval of the negative transition or a second time interval of the positive transition, wherein the second time interval of the negative transition is a time interval for a transition from the second time point to the first time point and the second time interval of the positive transition is a time interval for a transition from a second voltage level of the phase cut AC input signal to 0V;

determining, by the micro-controller, a positive phase angle or a negative phase angle, wherein the positive phase angle is determined in accordance with the first time interval of the positive transition and the second time interval of the positive transition, and the negative phase angle is determined in accordance with the first time interval of the negative transition and the second time interval of the negative transition;

producing, by the micro-controller, a pulse width modulated (PWM) signal in response to one or more of voltage, frequency, dimmer type and phase angle requirements determined from one or more signals selected from the group consisting of the first time interval of the positive transition, the second time interval of the positive transition, the first time interval of the negative transition, the second time interval of the negative transition, a period of the phase cut AC input signal; and generating, by a DC output chopper, a chopped DC output duty cycle voltage signal from a DC output signal derived from the phase cut AC input signal in response to the PWM signal to provide linear dimming for a LED load.

* * * * *